United States Patent [19]

Green

[11] 4,256,527

[45] Mar. 17, 1981

[54] SLIDE MOUNTING APPARATUS

[75] Inventor: Lawrence E. Green, Burlington, Mass.

[73] Assignee: Polaroid Corporation, Cambridge, Mass.

[21] Appl. No.: 95,241

[22] Filed: Nov. 19, 1979

[51] Int. Cl.[3] ............................................. B32B 31/16

[52] U.S. Cl. .................................... 156/443; 156/108; 156/514; 156/517; 156/521; 156/564; 156/569; 156/570; 156/573

[58] Field of Search ............... 156/108, 293, 423, 443, 156/514, 517, 521, 564, 565, 569, 570, 573; 83/375

[56] References Cited

U.S. PATENT DOCUMENTS

| | | | |
|---|---|---|---|
| 3,043,363 | 7/1962 | Byers | 156/521 |
| 3,067,805 | 12/1962 | Flynn | 156/443 |
| 3,085,618 | 4/1963 | Brundage | 156/530 |
| 3,780,608 | 12/1973 | Brown | 156/514 |
| 3,992,243 | 11/1976 | Berggren et al. | 156/521 |
| 4,172,003 | 10/1979 | Bachelder et al. | 156/517 |

FOREIGN PATENT DOCUMENTS

| | | |
|---|---|---|
| 1382895 | 2/1975 | United Kingdom . |
| 1510249 | 5/1978 | United Kingdom . |

*Primary Examiner*—Caleb Weston
*Attorney, Agent, or Firm*—Alfred E. Corrigan

[57] ABSTRACT

A compact, manually operable apparatus for sequentially cutting sections of an elongate strip of photographic film containing a plurality of distinct, individual exposures or images and mounting the same in individual frames for subsequent viewing, e.g. in a slide projector. The apparatus includes structure for folding an apertured portion of a frame onto another apertured portion of the frame so as to enclose a section of the film therebetween as the frame is being moved toward a station whereat the two frame portions are fixedly secured to each other.

3 Claims, 7 Drawing Figures

SLIDE MOUNTING APPARATUS

BACKGROUND OF THE INVENTION

1. Field of the Invention

This invention relates to compact, manually operable apparatus for cutting individual scenes from a strip of photographic film and mounting the same in frames for subsequent viewing.

2. Description of the Prior Art

Generally, when a photographer wants his transparency prints mounted in frames suitable for use in a projector, he sends them to a commerical establishment where they are put on an assembly line similar to that shown in British Pat. No. 1,382,895. There, sections of the film are severed, placed in frames or holders which are then sealed and moved to a bin from which they are taken and hopefully matched with the correct customer's order form for subsequent mailing to the customer.

Another type of apparatus for cutting and mounting sections of an elongate strip of film is shown in British Pat. No. 1,510,249. In this apparatus, an end of the film strip is partially inserted between apertured base and cover portions of a frame at a severing or cutting station, the base and cover portions having been spread apart to form a gap into which the end of the film strip is inserted. The film strip is then severed and the severed section and the slide frame are transported together along a path so that a corner of the severed section engages and slides along a slot in a surface of a guide member located adjacent said path. The surface of the guide member forms an acute angle with said path of travel to thus cause the severed section to move transversely of the path of travel to its desired position within the frame. A disadvantage with this type of apparatus is that the end of the severed section located in engagement with the guide member may buckle due to the increasing frictional forces being applied to the remainder of the severed section by the base and cover portions of the frame as the severed section is moved to its desired position within the frame.

Still another type of apparatus is shown in U.S. Pat. No. 3,992,243, wherein the upper and lower portions of a frame are separated from each other so as to enable an end of a film strip to be located on the lower portion of the frame. The end of the film strip is then severed and the upper portion of the frame is moved into engagement with the severed section of the film while integral projections on the lower portion are received by corresponding apertures located in the upper portion of the frame for securing the two portions together. The relative complexity and resulting cost of the mechanism for opening and closing the upper portion of the frame while maintaining the proper spatial relation between the two portions of the frame detracts from its use by one who wishes to mount his own exposures.

The photographer may buy his own frames and do the mounting himself with an apparatus similar to that shown in U.S. Pat. No. 3,085,618. In this apparatus a section of a film strip is aligned with an aperture in a male die and a card having an aperture therein is located in alignment with the section of film to be severed. A lever is then depressed which, in turn, drives the male die forward first severing the film strip in two places and then advances the severed portion into contact with an adhesive sheet which extends over at least a portion of the aperture in the card. One must then remove the card from the apparatus and trim it to a size which is compatible with a slide tray or a projector. Even then the resulting product suffers in comparison to that received from the commercial establishment. For example, since the severed section is in effect laminated onto the sheet, it can readily be seen that if the adhesive bond therebetween subsequently fails along an edge thereof, this edge may be hung up as the card is being moved into and/or out of its exposure position within the projector. Further, since the adhesive sheet extends over at least a portion of the aperture in the card, there will be a problem in projecting that portion of the image in the severed section which is in engagement with the adhesive sheet.

An example of an inexpensive, compact, manually operable apparatus for cutting and mounting a portion of a visible image is shown and described in U.S. Pat. No. 4,172,003. This apparatus is ideally suited for use on top of a bench or table and includes a cutting section at which a photograph is positioned such that a portion of its visible image may be cropped and then severed. The severed portion is then advanced through an open end in a frame to its desired position within the frame. While this apparatus has many desirable features, it is not readily adaptable to use with an elongate strip of film.

SUMMARY OF THE INVENTION

The instant invention relates to a compact, manually operable apparatus for sequentially severing and mounting individual sections of an elongate strip of photographic film, preferably of the 35 mm type, for subsequent use with a slide projector. Specifically, the apparatus, which is adapted to be supported on a work bench or table top, includes a film chamber which is adapted to receive a container having a plurality of frames stacked therein.

Each of the frames includes first and second portions integrally hinged along one side thereof for movement between a first orientation within the container where each portion of the frame is located in a common plane, and a second orientation, exterior of the container whereat they are located in face-to-face relation. Each of the portions includes a rectangularly shaped aperture through which light is adapted to be passed so as to project an image of a section of film located therebetween onto a viewing surface. The first portion of each frame includes a mask having a generally rectangularly shaped aperture of slightly larger dimensions than the first mentioned apertures. One side of the mask is laminated to one side of the first portion so as to define a recessed area into which a section of film is to be located prior to moving the second portion of the frame into face-to-face relation with the opposite side of the mask. Each mask includes a retainer at at least one of the corners of its aperture, which retainer cooperates with an underlying section of the first portion for frictionally retaining an end of an elongate strip of photographic film.

The film chamber is constructed to locate the container such that the first portion of an endmost frame in the stack is located in position to receive the free end of an elongate strip of film as it is advanced thereto by a first manually operable advancing apparatus. As the end of the strip is advanced into superposition with the first portion of the frame, its opposite corners are guided so as to slide between the retainer(s) and the aforementioned underlying section of the first portion of the frame to thereby frictionally retain the end of the film strip in position. A cutting wheel is then moved transversely across the path of movement of the strip of film to thereby sever the section of the strip overlying the first portion of the frame from the remainder of the strip.

A second manually operable advancing apparatus is mounted adjacent to the film chamber for moving the endmost frame and the severed section of the film strip to a station whereat the two positions of the frame are to be permanently secured in face-to-face relation.

Means are provided intermediate the film chamber and the securing station for automatically moving the second portion of the endmost frame into face-to-face relation with the first portion as the frame is being moved toward the securing station. These means includes a coiled spring having one of its free ends fixedly secured to the apparatus and its other free end located in the path of travel of the endmost frame as it moves toward the securing station. The other end of the spring includes a curved section which is adapted to be engaged by an edge of the second portion of the frame during its movement toward the securing station. Continued movement of the frame by the second advancing means results in the curved end of the spring rotating the second portion of the frame about its integral hinge with the first portion through an angle of approximately 120°. At this point, an inclined surface of the apparatus functions to continue the rotation of the second portion into face-to-face relation with the first portion as the frame enters a narrow slot, hinge first, which slot leads to the securing station.

The narrow slot provides a means by which the frame may be moved by the second advancing means into the securing station. The station includes a stationary heater plate which is positioned to receive and support the frame as it moves out of the slot and a movably mounted heater plate located above the stationary plate. The movably mounted heater plate is provided with a lever which, when depressed, activates a timing circuit while simultaneously moving the movable heater plate into contact with the frame thereby urging the latter into more intimate contact with the stationary heater plate. The plates, which had previously been brought up to operating temperature, apply heat to the opposite exterior surfaces of the frame so as to activate an adhesive coated on at least the interior surface of one of the portions of the frame to thereby permanently secure the two portions in face-to-face relation. At the end of a predetermined period of time, the timing circuit activates a signal to tell the operator of the apparatus that the securing operation has been completed. The operator thereupon releases the lever for movement of the movable heater plate back to its original position. The operator then closes a switch to connect a third advancing means with a source of energy. So energized, the third advancing means engages an edge of the frame and advances it to the exterior of the apparatus via an egress slot.

An object of the invention is to provide an apparatus for cutting sections of an elongate strip of film and mounting them in individual frames with means for facilitating the movement of portions of the frame into face-to-face relation so as to encase a section of film therebetween.

Another object of the invention is to provide apparatus of the type described with means for applying substantially the same amount of heat to each side of a frame so as to minimize any warping of the same.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
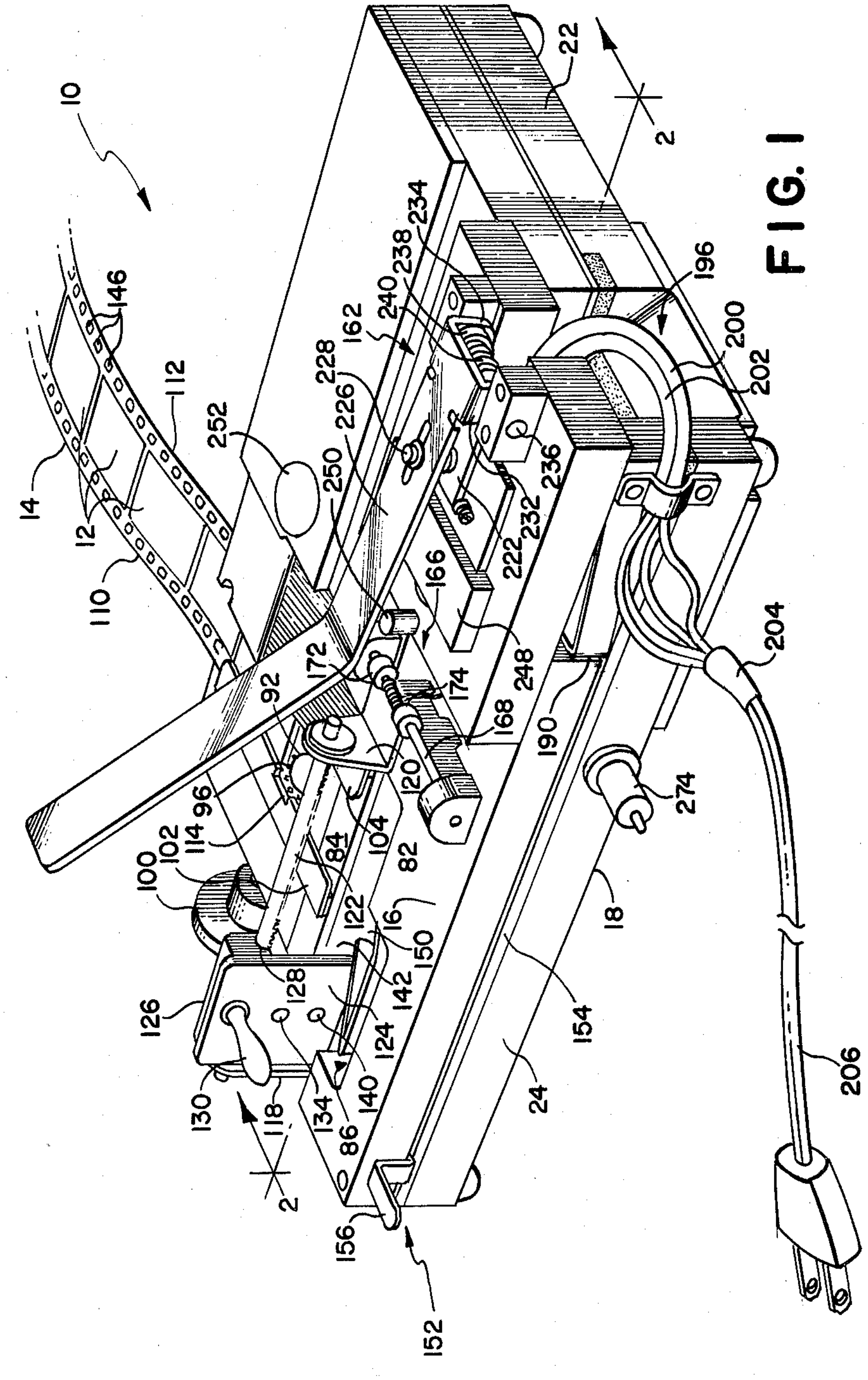
FIG. 1 is a perspective view of a slide cutting and mounting apparatus.

Reference is now made of the drawings and particularly to FIG. 1 wherein is shown a compact, manually operable apparatus 10 for severing and mounting individual sections 12 of an elongate strip of photographic film 14. The apparatus includes a top wall 16, a bottom wall 18, end walls 20 and 22, and a pair of side walls 24 and 26. The bottom wall 18 includes a chamber 28 for receiving a frame assemblage of the type shown in FIG. 4.

Figure 4:
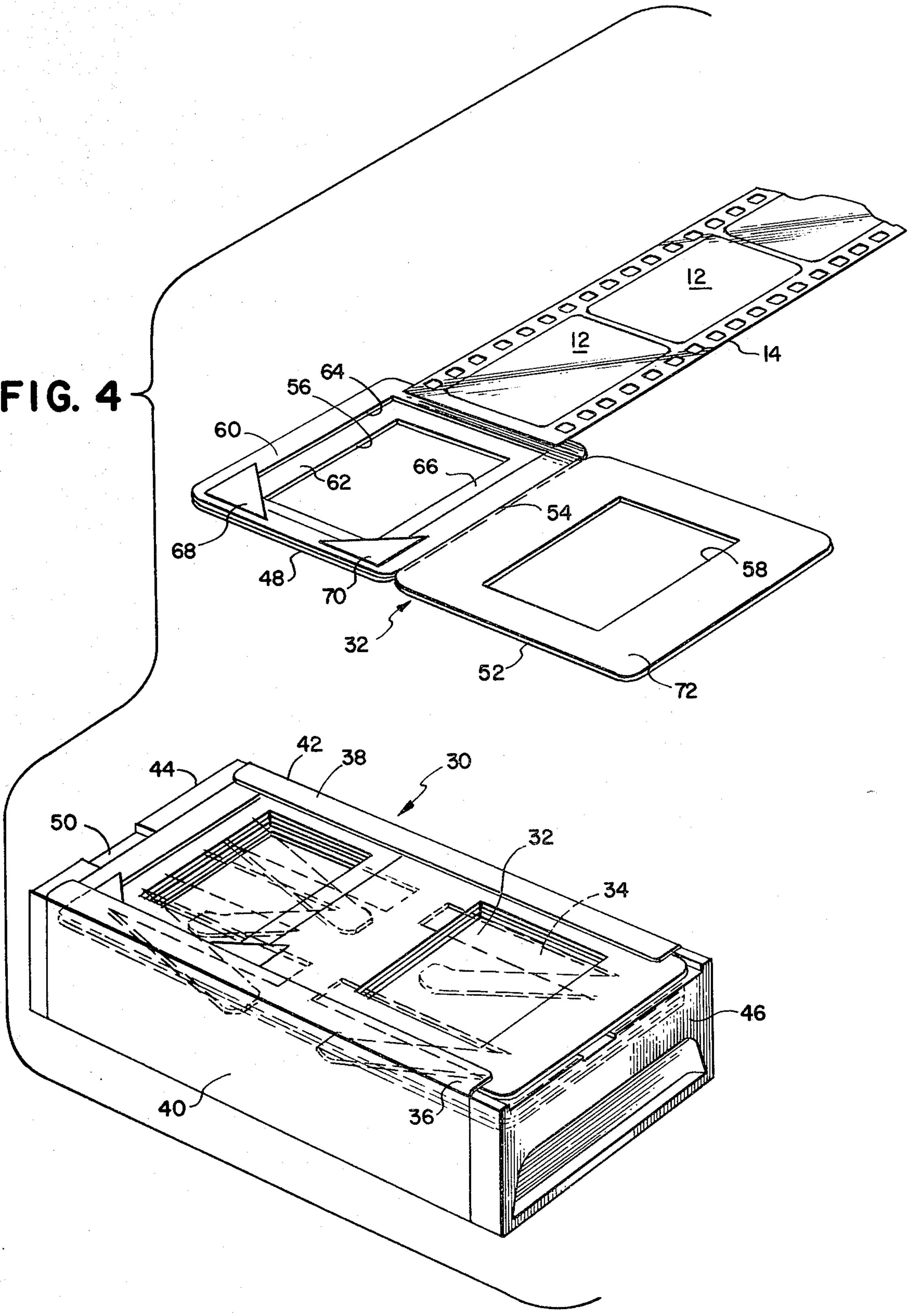
FIG. 4 is a perspective view of a frame assemblage usable with the instant invention, the view also showing a frame spaced from its container and showing its orientation relative to an end of an elongate strip of photographic film.

The frame assemblage shown in FIG. 4 includes a rectangularly shaped container 30 for housing a stack of frames 32 and a spring 34. The spring 34 is adapted to urge the uppermost frame into engagement with a pair of flanges 36 and 38 which extend inwardly a short distance toward each other. The flanges 36 and 38 extend at right angles to their respective side walls 40 and 42 which, in turn, are integrally connected to opposite ends of a pair of end walls 44 and 46. As viewed in FIG. 4, the bottom surfaces of the flanges 36 and 38 are vertically spaced from the top of each of the end walls 44 and 46 by a distance slightly in excess of the maximum thickness of the portion 48 of the frame 32 to thereby allow the uppermost frame 32 to slide over the top of the end wall 46 as it is being ejected from the container 30. The top surface of the wall 44 is recessed at 50 so as to receive a portion of an apparatus for advancing the uppermost frame 32 from the stack, as will be more fully explained.

Each of the frames 32 includes a first portion 48 and a second portion 52 integrally hinged to each other at 54 for movement between a first orientation within the container 30 where each portion 48 and 52 is located in a common plane, and a second orientation, exterior of the container, whereat they are located in face-to-face relation. The first portion 48 is provided with a generally rectangularly shaped aperture 56 which is adapted to be located in alignment with a similar aperture 58 located in the second portion 52 when the two portions 48 and 52 are in the second orientation. The first portion 48 includes a mask 60 which is secured by any suitable means to a side 62 of the first portion 48. The mask 60 is provided with an aperture 64 having length and width dimensions greater than those of the underlying aperture 56 to thereby create an area or recess 66 having a depth equal to the thickness of the mask 60. Triangularly, shaped retainers 68 and 70 are suitably secured to the mask 60 so as to overlie corner portions of the recess 66 and define pockets for receiving the opposite corners of the free end of the elongate strip of film 14. The surface 72 of the second portion 52 is preferably impregnated with a heat activated adhesive for securing the two portions 48 and 52 in face-to-face relation.

Figure 2:
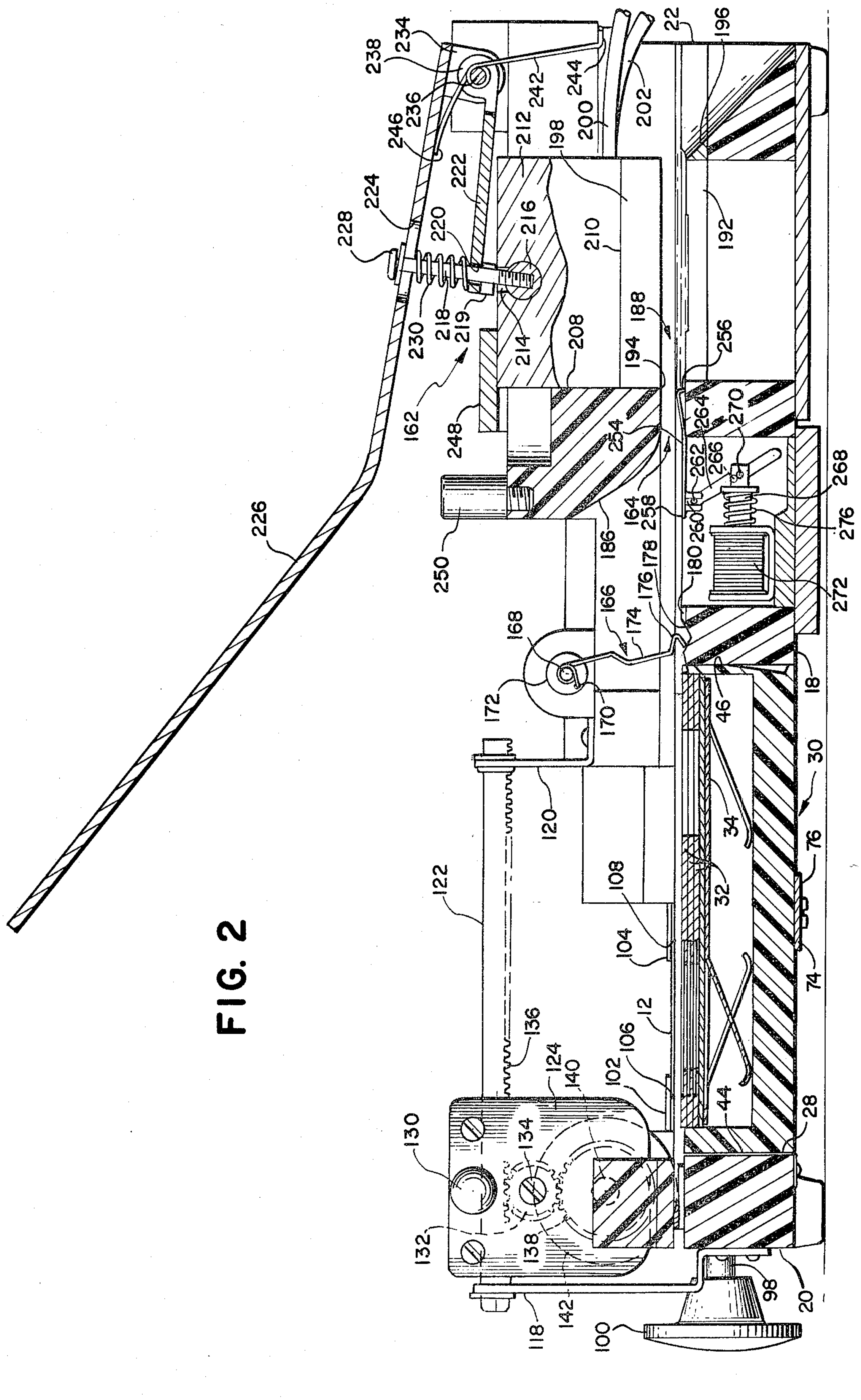
FIG. 2 is a sectional view of FIG. 1 taken generally along the line 2—2 in FIG. 1.
Figure 3:
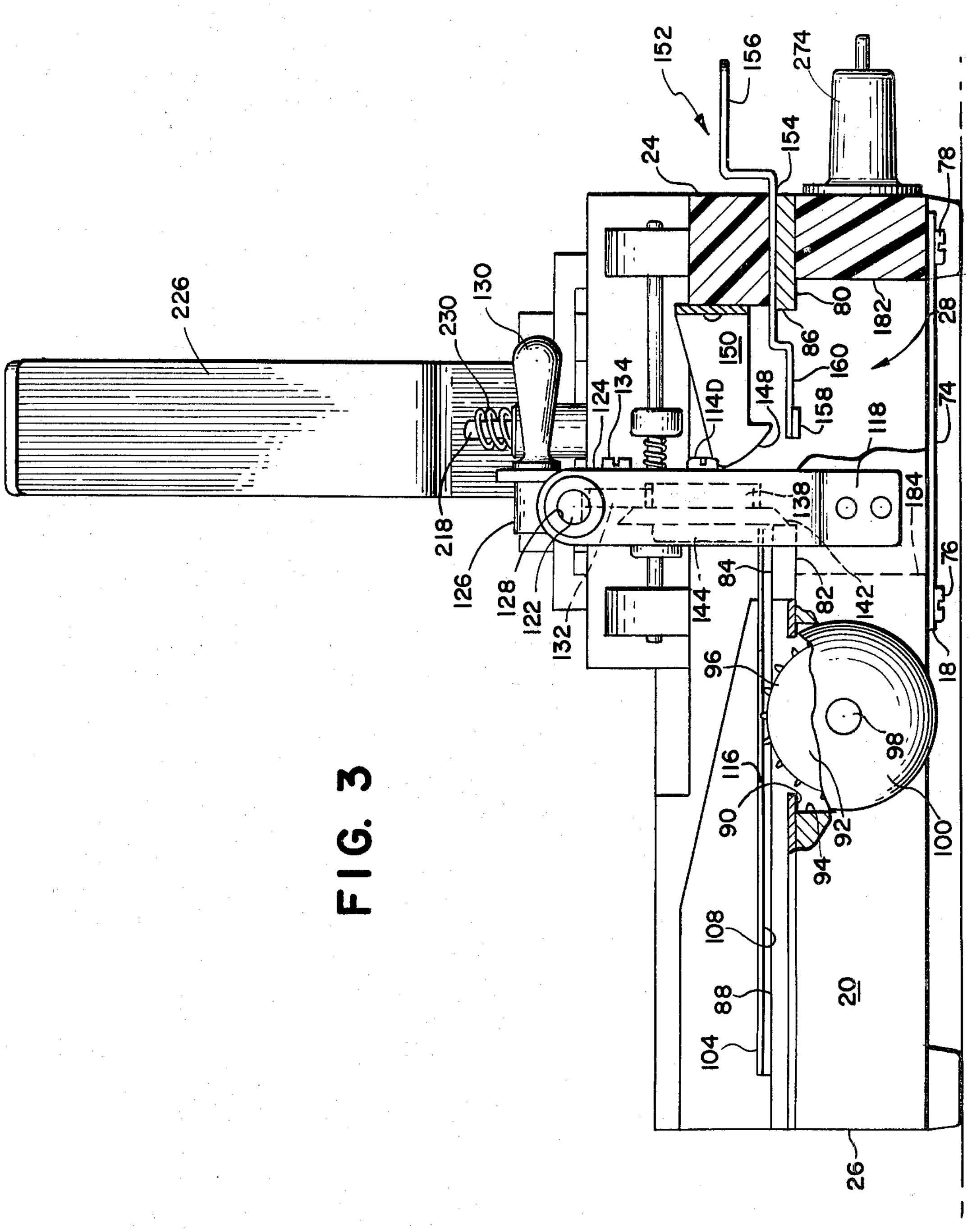
FIG. 3 is an end view of the apparatus with portions broken away.

The container 30 is adapted to be secured within the chamber 28 by an arm 74 suitably pivoted to the bottom wall 18 by a pin 76. The opposite end of the arm 74 includes a recess (not shown) for receiving the shank of a screw 78 for locking the arm in place, as shown in FIGS. 2 and 3. The arm 74 supports the container 30 within the chamber 28 such that the flange 36 of the container 30 is in engagement with a wall 80 (see FIG. 3), and the flange 38 is in engagement with the bottom surface 82 of a cutting bar 84 (see FIGS. 1 and 3). The container 30 is not shown in FIG. 3 for reasons of clarity. So positioned, the first portion 48 of the uppermost frame 32 in the stack is located so as to receive a section 12 of the film strip 14 via an opening 86 in the top of the chamber 28.

The top wall 16 of the apparatus includes a recessed area defined in part by a substantially flat surface 88 which is adapted to support the free end of the elongate strip of film 14, as best shown in FIG. 1. The surface 88 is provided with an opening 90 for receiving a portion of a cylinder 92 rotatably mounted within a chamber 94 located beneath the surface 88. A sprocket wheel 96 (only one being shown) is secured to opposite longitudinal ends of the cylinder 92 and a shaft 98 extends from one end of the cylinder 92 to the exterior of the apparatus 10 whereat a manually operative handle 100 is fixedly attached thereto. A pair of longitudinally extending, laterally spaced guides 102 and 104 are secured to the surface 88. The bottom of each of the guides 102 and 104 is undercut or recessed at 106 and 108, respectively, to define longitudinally extending channels for receiving the opposite edges 110 and 112 of the film 14. Also, each of the guides 102 and 104 is notched at 114 and 116, respectively, so as to receive the teeth of the sprocket wheels 96.

The apparatus 10 includes means for severing a section 12 from the elongate strip of film 14. Specifically, these means include a pair of upwardly extending brackets 118 and 120 which are adapted to rotatably support the ends of a shaft 122. The shaft 122 slidably supports a plate 124 having an enlarged section 126 with a U-shaped slot 128 which rides on top of the shaft 122. A handle 130 extends from one side of the plate 124 and provides a means of moving the plate 124 in a reciprocating manner along the shaft 122. An idler gear 132 is rotatably secured to the opposite face of the plate 124 by a fastener 134. The teeth of the idler gear 132 are in mesh with the teeth of a gear rack 136 formed in the lower surface of the shaft 122 thereby cooperating with the U-shaped slot 132 to prevent vertical movement of the plate 124 with respect to the shaft 122. A second, larger diameter, gear 138 is secured to the same side of the plate 124 by a fastener 140 with its teeth in mesh with those of the gear 132. The gear 138 includes an integrally formed cutting wheel having a cutting edge 142 and a circular land 144 which is adapted to ride on the adjacent edge of the cutting bar 84.

In the operation of the apparatus, as described up to this point, the free end of the film 14 is slid along the surface 88 such that the edges 110 and 112 of the film 14 are located within the recesses 106 and 108, respectively. The film 14 is advanced over the teeth of the sprocket wheels 96 such that they enter the apertures 146 which run along the longitudinal sides 110 and 112 of the film 14. The handle 100 is then manually rotated in a clockwise manner (as viewed in FIG. 3) to enable the sprocket wheels 96 to advance the leading end of the film 14 toward the first portion 48 of the uppermost frame 32. After the leading edge of the film 14 moves over the cutting bar 84, it engages the inclined surfaces 148 of a pair of laterally spaced arms 150 and is deflected downwardly such that its corners slide under the triangularly shaped retainers 68 and 70 on the first portion 48 of the endmost or uppermost frame 32 and engage an edge of the mask 60. The operator then stops rotating the handle 100 and engages the handle 130 to move the plate 124 from the position shown in FIG. 1 to a position adjacent the bracket 120. This latter movement causes the gear rack 136 to rotate the gear 132 in a counterclockwise direction (as viewed in FIG. 2) thereby causing clockwise rotation of the gear 138 and its associated cutting edge 142 to sever a section 12 from the strip of film 14. The severed end of the section then drops into the recess 66 in the first portion 48 of the endmost frame 32. The endmost frame and severed section 12 of the film are now ready to be transferred as a unit away from the locating means, i.e., the chamber 28.

The apparatus for advancing the endmost frame 32 from the locating means or chamber 28 includes a second advancing means, the first advancing means being the aforementioned described cylinder 92, sprocket wheels 96 and handle 100. The second advancing means comprises a lever 152 slidably mounted within a slot 154 in the side wall 24 of the apparatus 10 for reciprocating movement. The lever 152 includes a portion 156 which is adapted to be manually grasped prior to reciprocating the lever 152, and a frame engaging member 158 secured in cantilevered fashion to an end 160 of the lever 152. Suitable means (not shown) are provided for preventing lateral movement of the lever 152 within the slot 154, i.e., movement from right to left, as viewed in FIG. 3. As viewed in FIG. 2, the member 158 extends from the end 160 of the lever 152 through the recess 50 in the top surface of the trailing end wall 44 of the container 30 and into engagement with the left-hand edge of the first portion 48 of the endmost frame 32.

The endmost frame 32 is adapted to be moved from the position shown in FIG. 2 to a securing station 162 whereat the two portions 48 and 52 of the frame are to be permanently secured in face-to-face relation with the section 12 of film located therebetween. Prior to the frame 32 entering the receiving station 162 via an ingress 164, the second portion 52 is moved into said relationship by means located intermediate the chamber 28 and the securing station 162. These means include a spring 166 which is coiled about a rod 168. One end 170 of the spring 166 is secured to an annular collar 172 which, in turn, is fixedly securd to the rod 168. The other end 174 of the spring 166 includes a V-shaped section 176 which is normally located in the path of travel of a frame 32 as it moves toward the securing station 162. The V-shaped section 176 is located in a shallow recess 178 located in a generally horizontal surface 180 so as to enable the leading edge (to the right, as viewed in FIG. 2) of the second portion 52 of the frame 32 to enter the bight of the V-shaped section 176 as the frame 32 is moved toward the securing station 162.

Figure 5A:
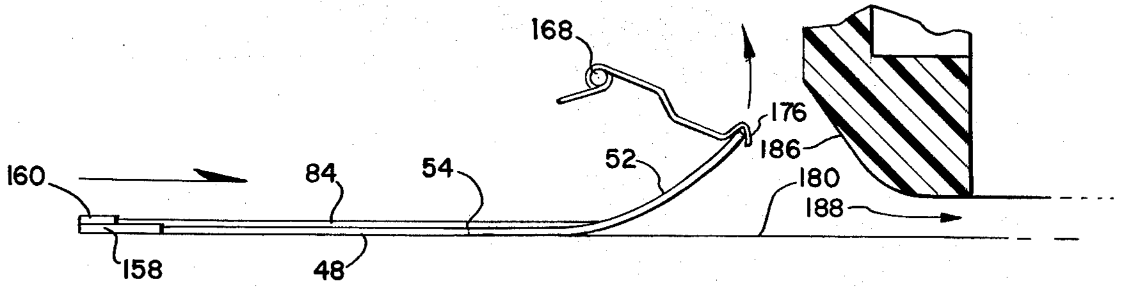
FIGS. 5A through 5C diagrammatically show sequential steps in the folding of one portion of a frame into face-to-face relation with another portion of the frame.
Figure 5B:
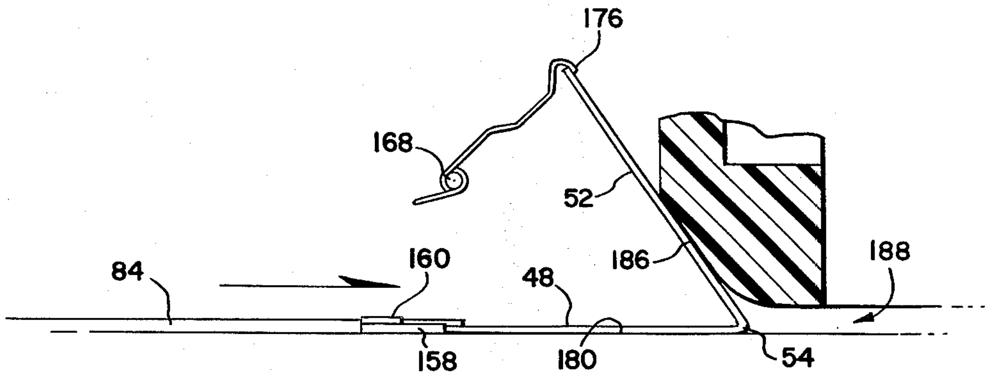
Figure 5C:
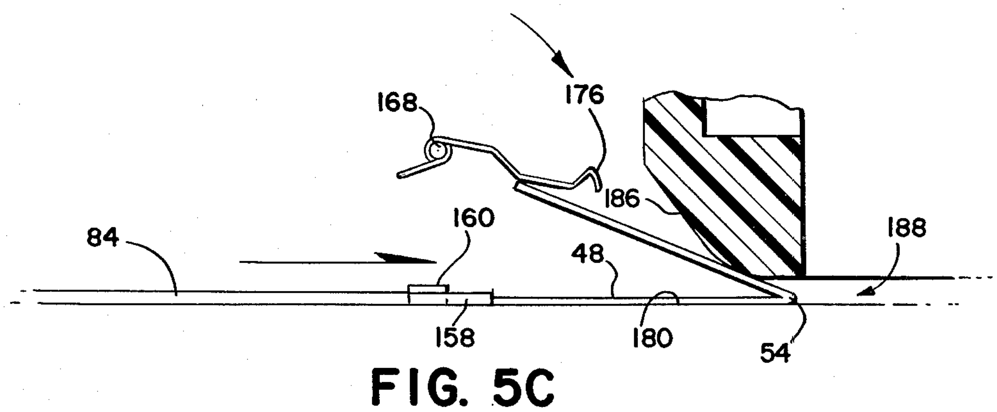

The frame 32 is guided along its path of travel from the locating means 28 to the securing station 162 by the lower surface of the wall 80 and the bottom surface 82 of the cutting bar 84 and by the opposing surfaces 182 and 184 of the chamber 28 (see FIG. 3). The leading edge of the second portion 52 of the frame 32 enters the bight of the V-shaped section 176 shortly after it moves away from the leading end wall 46 of the container 30. Further movement of the frame 32 by the second advancing means 152 results in the end 174 of the spring 166 being moved in a counterclockwise direction thereby urging the second portion 52 upwardly, as shown in FIG. 5A. This upward movement is partially restrained by the right ends of the cutting bar 84 and the wall 80. The end 174 of the spring 166 continues to guide the second portion 52 upwardly until the frame 32 is advanced to the point whereat the hinge 54 moves out from under the ends of the cutting bar 84 and the wall 80. At this movement, the second portion rotates about the hinge 54 and assumes a generally vertical position. Continued forward movement of the frame 32 results in the leading edge of the second portion 52 being restrained while the hinge 54 now becomes the leading edge of the frame 32. Still further movement of the frame 32 results in the second portion 52 moving into engagement with an inclined surface 186 as the hinge 54 enters a narrow passageway 188 which leads to the securing station 162, as best shown in FIG. 5B. As the leading edge of the frame 32, as represented by the hinge 54, enters the passageway 188, the inclined surface 186 cams the second portion 52 into face-to-face relation with the first portion 48 thereby enclosng the section 12 of film therebetween. The counterclockwise movement of the end 174 of the spring 166 charges or partially unwinds the spring thereby increasing its bias in a clockwise direction. This bias enables the end 174 to assist the movement of the second portion 52 into face-to-face relation with the first portion 48 as the end 174 returns to its original position. Finally, forward movement of the frame 32 is terminated when the manually actuatable portion 156 of the lever 152 engages a stop 190 protruding from the side wall 24 of the apparatus thereby positioning the thus folded frame 32 on top of a heating element or stationary plate 192.

The securing station 162 includes an ingress 194, an egress 196 in the end wall 22, the aforementioned stationary plate 192 and a superposed heater element or plate 198. The contact surface of each of the plates 192 and 198 is at least coextensive with that of the folded frame 32. A pair of conduits 200 and 202 enclose the electrical leads for two parallel circuits having means for independently controlling the temperature of the heating elements or plates 192 and 198. The ends of the electrical leads are connected at 204 to an electrical cord 206.

The plate 198 is mounted within a rectangularly shaped recess 208 located within the top wall 16 of the apparatus 10 for movement in a vertical direction as depicted by the arrows in FIG. 2. An upper surface 210 of the plate is suitably secured to a support 212. The support 212 is bored at 214 so as to receive a ball 216. The ball 216 is threaded onto an end of a bolt 218 which, in turn, passes through an aperture in a pressure pad 219, an aperture 220 in a first arm 222 and an elongate slot 224 in a second arm 226. The bolt 218 has a head 228 whose diameter is greater than the width of the slot 224. A spring 230 encircles the shank of the bolt 218 and functions to resiliently maintain the spacial relationship between the first and second arms 222 and 226 and to slow the movement of the arm 226 as the latter approaches a stop 250. A pair of downwardly turned flanges 232 and 234 extend from an end of the second arm 226. Each flange is provided with an aperture whereby a pin 236 may be inserted through one of the apertures, through a journal 238 located at an end of the first arm 222, through a second journal at the end of the first arm, and then through the other aperture to thereby pivotally couple the arms 222 and 226 to each other and to the apparatus 10. A spring 240 encircles the pin 236 such that one end 242 of the spring 240 is fixedly secured at 244 while its other end 246 is located in engagement with the underside of the second arm 226 to thereby bias the arms 222 and 226 into the position shown in FIG. 2. Further clockwise rotation of the arms 222 and 226 out of this position is prevented by a stop 248. Counterclockwise rotation of the manually actuatable second arm 226 is limited by the stop 250.

Continuing with the operation of the apparatus, and assuming that the cord 206 has been plugged into a suitable receptacle and the plates 192 and 198 brought up to their operating temperature, the operator depresses the second arm 226 thereby moving the support 212 and movable heating element or plate 198 downwardly until the plate 198 engages the folded frame 32. Initial movement of the second arm 226 closes a switch (not shown) which, in turn, activates a timing circuit. After a predetermined period of time, preferably five seconds, the timing circuit activates an alarm having a speaker 252 to tell the operator that the two sections 48 and 52 of the frame 32 have been secured together by the aforementioned heat activated adhesive. The operator releases the second arm 226 in response to the alarm thereby enabling the spring 240 to return the various elements to the position shown in FIG. 2. The frame 32 and the enclosed section 12 of film 14 are now ready to be removed from the securing station 162.

The means for removing the frame 32 from the securing station 162 comprises a third means for advancing the frame 32. Specifically, the third means includes a frame engaging member 254 which is mounted within the passageway 188 with its free end 256 located adjacent the ingress 194 to the securing station 162. The free end 256 is cantilevered and ramped upwardly such that it may be deflected downwardly by the hinge 54 of the frame 32 as the latter is moved into position on top of the plate 192. The member 254 is formed from a resilient material and therefore the end 256 springs back into the position shown in FIG. 2 immediately after the frame 32 passes thereover. The opposite end 258 of the member 254 includes means defining a downwardly extending slot 260 which is adapted to slidably receive a pin 262 extending outwardly from an end of an arm 264. The arm 264 is pivotally coupled intermediate its ends at 266 and to the end of an armature 268 at 270. The armature 268 is reciprocally mounted within a field coil 272 such that upon energizing the coil 272 by closing a switch 274 (see FIG. 1) the armature is moved to the left, as viewed in FIG. 2, thereby rotating the arm 264 in a clockwise direction. Rotation of the arm 264 in this manner is transmitted to the frame engaging member 254 by the aforementioned pin and slot arrangement 262 and 260, respectively, to drive the member 254 to the right thereby propelling the frame 32 from its position on top of the plate 192 to the exterior of the apparatus via the egress 196. A spring 276 returns the solenoid 268 and the member 254 to the position shown in FIG. 2 upon the deenergization of the coil 272.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Manually operable, compact apparatus for sequentially cutting sections of an elongate strip of photographic film containing a plurality of distinct, individual images, and mounting the same in individual frames for subsequent use in a slide projector, said apparatus comprising:

means for locating a stack of frames in position for an endmost frame in the stack to receive a section of an elongate strip of film containing a visible image, each of the frames including a first apertured portion adapted to receive a section of the film and a second apertured portion adapted to be moved into face-to-face relation with the first portion to thereby retain the section of film therebetween;

first means for advancing an end of the elongate strip of film onto the first portion of the endmost frame positioned at said locating means such that a section thereof containing a distinct, individual image is located in substantial alignment with the aperture in the first portion of the endmost frame;

means for cutting the section of film from the remainder of the elongate strip;

a station having an ingress and an egress, said station including means for securing the first and second portions of the endmost frame in face-to-face relation with the apertures in each portion being located in substantial alignment with each other;

second means for advancing the endmost frame from said locating means to said station;

means, mounted intermediate said locating means and said securing means, for automatically moving the second portion of the endmost frame into face-to-face relation with the first portion as the frame is being advanced from said locating means to said station; and third means for advancing the endmost frame from said station via said egress after the first and second portions of the frame have been secured in face-to-face relation with the section of film secured therebetween.

2. The apparatus as defined in claim 1 wherein said means for moving the second portion of the frame into face-to-face relation with the first portion includes a coiled spring having one of its ends fixedly secured to said apparatus and its opposite end located in the path of travel of the frame as it is moved toward said station.

3. The apparatus as defined in claim 1 wherein said securing means includes a pair of heating elements between which a frame is adapted to be positioned by said second advancing means.

* * * * *